United States Patent
Fernandez

(10) Patent No.: US 12,157,708 B2
(45) Date of Patent: Dec. 3, 2024

(54) METHOD FOR CREATING COOLING HOLES IN A CMC LAMINATE

(71) Applicant: Raytheon Technologies Corporation, Farmington, CT (US)

(72) Inventor: Robin H. Fernandez, Litchfield, CT (US)

(73) Assignee: RTX Corporation, Farmington, CT (US)

(*) Notice: Subject to any disclaimer, the term of this patent is extended or adjusted under 35 U.S.C. 154(b) by 855 days.

(21) Appl. No.: 17/314,434

(22) Filed: May 7, 2021

(65) Prior Publication Data
US 2022/0356125 A1    Nov. 10, 2022

(51) Int. Cl.
*C23C 16/458* (2006.01)
*C04B 41/53* (2006.01)

(52) U.S. Cl.
CPC ........ *C04B 41/53* (2013.01); *C04B 2235/614* (2013.01); *C04B 2235/77* (2013.01)

(58) Field of Classification Search
CPC ..... B29C 33/0033; B29C 33/12; B29C 33/14; B29C 33/48; B29C 33/485; B29C 33/76; C23C 16/4581; C23C 16/458; C23C 16/45502; C23C 16/4418
See application file for complete search history.

(56) References Cited

U.S. PATENT DOCUMENTS

| | | | |
|---|---|---|---|
| 3,895,084 A * | 7/1975 | Bauer | C04B 35/5607 264/296 |
| 7,892,646 B1 * | 2/2011 | Rudolph | C23C 16/045 428/408 |
| 8,893,367 B2 | 11/2014 | Lander | |
| 10,307,973 B2 | 6/2019 | Lander et al. | |
| 10,774,005 B2 | 9/2020 | Propheter-Hinkley | |
| 2005/0093188 A1 * | 5/2005 | Forest | F16D 69/023 264/29.1 |
| 2013/0272850 A1 * | 10/2013 | Bunker | F01D 5/147 29/888 |
| 2018/0141287 A1 | 5/2018 | Lander et al. | |
| 2019/0211695 A1 | 6/2019 | Propheter-Hinkley et al. | |
| 2019/0210929 A1 * | 7/2019 | Propheter-Hinckley | C04B 35/62218 |

FOREIGN PATENT DOCUMENTS

| | | |
|---|---|---|
| EP | 3508316 A2 | 7/2019 |
| EP | 3508317 A2 | 7/2019 |

OTHER PUBLICATIONS

Extended European Search Report for EP Application No. 22168495.4, dated Oct. 6, 2022, 8 pages.

* cited by examiner

*Primary Examiner* — Matthew J Daniels
(74) *Attorney, Agent, or Firm* — Kinney & Lange, P.A.

(57) ABSTRACT

A method for forming a hole in a ceramic matrix composite component includes providing a first tool component with a first hole, providing a fiber preform of the ceramic matrix composite component on the first tool component, positioning a second tool component on the fiber preform, such that the fiber preform is disposed between the first and second tool components, inserting a rod into the first and second holes and through the fiber preform, and performing a densification step of the fiber preform in the first and second tool components. The second tool component has a second hole coaxial with the first hole. The fiber preform is densified with a ceramic matrix.

14 Claims, 7 Drawing Sheets

METHOD FOR CREATING COOLING HOLES IN A CMC LAMINATE

BACKGROUND

The present disclosure relates generally to ceramic matrix composite (CMC) components, and more particularly to a method of manufacturing ceramic matrix composite components for use in gas turbine engines.

Lightweight CMC is a highly desirable material for gas turbine engine applications. CMCs exhibit excellent physical, chemical, and mechanical properties at high temperatures and are particularly suited for producing hot section components for gas turbine engines. Gas path components such as turbine blades, seals or shrouds, and combustor panels often include cooling passages for film cooling component surfaces. Cooling holes are typically provided to densified CMC components using machining processes, such as ultrasonic impact grinding, laser hole drilling, or electron beam discharge machining (EDM). These machining processes are time-consuming and cost-intensive and cause fiber breakage, which can weaken the CMC component or expose a surface to environmental attacks.

SUMMARY

In one aspect, a method for forming a hole in a ceramic matrix composite component includes providing a first tool component with a first hole, providing a fiber preform of the ceramic matrix composite component on the first tool component, positioning a second tool component on the fiber preform, such that the fiber preform is disposed between the first and second tool components, inserting a rod into the first and second holes and through the fiber preform, and performing a densification step of the fiber preform in the first and second tool components. The second tool component has a second hole coaxial with the first hole. The fiber preform is densified with a ceramic matrix.

In another aspect, a tool for forming holes in a ceramic matrix composite component includes a first tool component and a second tool component configured to confine a fiber preform of ceramic matrix composite component between the first and second tool components. The first tool component has a first hole. The second tool has a second hole and a plurality of third holes. The second hole is coaxial with the first hole. The plurality of third holes allows passage of densifying gases to the fiber preform. The third holes have a larger diameter than the second hole.

The present summary is provided only by way of example, and not limitation. Other aspects of the present disclosure will be appreciated in view of the entirety of the present disclosure, including the entire text, claims and accompanying figures.

Figure 1:
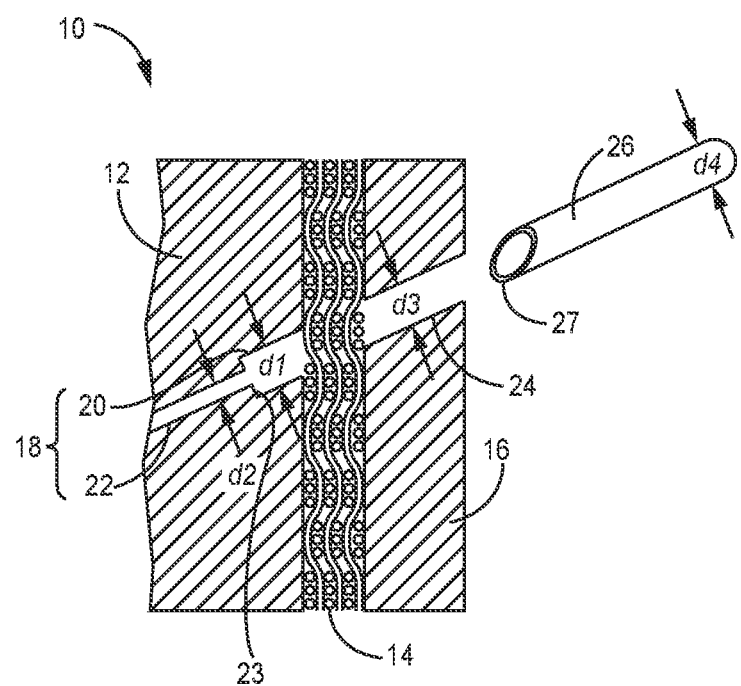
FIG. 1 is a cross-sectional view of a fiber preform of a ceramic matrix composite component in a tooling, illustrating a step of aligning holes in tool components in a method of forming a cooling hole.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to a method of forming cooling holes in a CMC component without causing fiber breakage or damage to the ceramic matrix. As discussed in further detail herein, the method uses guide tubes to precisely locate sacrificial rods in a fiber preform prior to densification. The rods are removed following a densification step, leaving precisely located cooling holes free of fiber breakage and damage to the ceramic matrix. It should be understood that the disclosed method is not limited to the formation of holes capable of carrying a cooling gas but can generally be applied to form passages through fiber-reinforced composite materials. For example, the disclosed method can be used to form retention holes (e.g., bolt holes) or passages for transporting fluids other than cooling air.

FIG. 1 is a cross-sectional view of assembly 10. First tool component 12, fiber preform 14, second tool component 16, counterbore hole 18, first hole portion 20, second hole portion 22, end 23, hole 24, guide tube 26, and guide tube end 27 are shown. Counterbore hole 18 is formed in first tool component 12 and includes first hole portion 20, second hole portion 22, and end 23. Hole 24 is formed through second tool component 16. Fiber preform 14 can be formed on first tool component 12 to match a shape of first tool component 12. Second tool component 16 is positioned over fiber preform 14 with holes 24 aligned coaxially with counterbore hole 18. Guide tube 26 is configured to be received in hole 24 and counterbore hole 18. Guide tube end 27 is stopped by end 23 of first hole portion 20. FIG. 1 illustrates a first step in a process of forming a cooling hole in CMC component. Specifically, FIG. 1 illustrates the assembling of first and second tool components 12 and 16 with fiber preform provided therebetween, and axial aligning hole 24 and counterbore hole 18 to allow passage of guide tube 26.

First tool component 12 and second tool component 16 can be molds or shaping structures for fiber preform 14. First tool component 12 and second tool component 16 can be formed of a material such as carbon, for example, graphite. First tool component 12 and second tool component 16 can be cast and/or machined with conventional methods and removed without damage to the CMC component. Each of first and second tool components 12 and 16 can be formed from multiple components. For example, first tool component 12 can be a formed in the shape of an airfoil core with one or more components each defining passages within an airfoil. When assembled, second tool component 16 can be disposed to fully or substantially surround first tool component 12 or can be disposed to fully or substantially cover fiber preform 14 positioned on one side of first tool component 12, for example, in the manufacture of a CMC panel or sheet.

First tool component 12 includes counterbore hole 18. Counterbore hole 18 can be a cylindrical stepped hole having first hole portion 20 and second hole portion 22. First and second hole portions 20 and 22 are coaxial. First hole portion 20 has a first diameter d1. Second hole portion 22 has a second diameter d2. The second diameter d2 is less than the first diameter d1. First hole portion 20 can have a length sufficient to locate an end of guide tube 26 in first tool component 12. First hole portion 20 can have a substantially flat bottom or end 23, as illustrated. In other examples, end 23 of first hole portion can be angled, for example, to match a shape of guide tube end 27 of guide tube 26. End 23 forms a stop for guide tube 26. Second hole portion 22 can be a blind hole formed to a depth sufficient to retain a rod but without extending through a side of first tool component 12. Counterbore hole 18 can be drilled with conventional machining methods. Counterbore 18 is located and oriented (e.g., angled) to form a desired cooling passage through the CMC component.

Fiber preform 14 comprises a plurality of ceramic fibers or fiber tows fibers, which can be woven, non-woven, braided, or selectively placed. For example, fiber preform 14 can be formed from a plurality of unidirectional or two-dimensional woven fiber plies or sheets. In other examples, fiber preform 14 can be formed from a three-dimensional weave. In some examples, fiber preform 14 can additionally include fabric filler materials, e.g., "noodles", and/or chopped fibers. Fiber preform 14 can be formed on or around first tool component 12. For example, first tool component 12 can be a shape of an airfoil core and fiber preform 14 can be wrapped around first tool component 12 to form an airfoil. In other examples, fiber preform 14 can form a panel (e.g., combustor panel) or segment member such as a blade outer air seal. It should be appreciated that the disclosed method is not limited to aerospace components and can be applied in other fiber-reinforced composite applications. Fiber preform 14 can be assembled separately from first and second tool components 12 and 16 and placed into first and second tool components 12 and 16 prior to densification. In other examples, fiber preform 14 can be formed directly on first tool component 12 (e.g., by braiding fiber tows or wrapping fiber plies around a surface of first tool component 12 or by fiber layup directly on a surface of first tool component 12). In some examples, fiber preform 14 can include a tackifier to help retain a shape of fiber preform 14 on first tool component 12. The tackifier material can be burned out prior to or during a densification process. Fiber materials can comprise a material stable at temperatures about 1000 degrees Celsium. Fibers materials can include, for example, silicon carbide (SiC), carbon (C), silicon oxycarbide (SiOC), silicon nitride ($Si_3N_4$), silicon carbonitride (SiCN), hafnium carbide (HfC), tantalum carbide (TaC), silicon borocarbonitride (SiBCN), zirconia, alumina, and silicon aluminum carbon nitride (SiAlCN).

Second tool component 16 is positioned on or around fiber preform 14, such that fiber preform 14 is disposed between first tool component 12 and second tool component 16. Second tool component 16 can have a shape that conforms to a desired outer shape of preform 14. Second tool component 16 can be formed of multiple components, which can be assembled together around fiber preform 14 such that an outer surface of preform 14 is fully or substantially covered by second tool component 16.

Second tool component 16 includes hole 24. Hole 24 extends fully through second tool component 16. Hole 24 can have a diameter d3 substantially equal to diameter d2 of first hole portion 20. Hole 24 is configured to receive guide tube 26. Hole 24 is coaxial with counterbore 18. First tool component 12 and second tool component 16 can include one or more alignment features used to align hole 24 with counterbore 18 to allow guide tube 26 to be received in both hole 24 and counterbore 18. For example, first and second tool components 12 and 16 can be keyed together with dowels and match holes or rectangular slots and matching bosses.

Guide tube 26 is a hollow tube with an opening at each end. Guide tube 26 is configured to receive a rod in the inner passage of guide tube 26. Guide tube 26 forms a sleeve around the rod. An outer diameter d4 of guide tube 26 is less than diameters d3 of hole 24 and d2 of first hole portion 20. The outer diameter d4 of guide tube 26 is greater than diameter d1 of second hole portion 22. As such, guide tube 26 cannot be received in second hole portion 22 and instead stops at end 23 of first hole portion 20. An inner diameter and/or cross-sectional area (shown in FIG. 4) of guide tube 26 can be substantially equal to or greater than a size of the desired cooling hole. In the disclosed aerospace application examples, cooling holes typically have diameters less than x but it should be understood that the disclosed method can be used to form holes of any size.

Guide tube 26 has end 27, which is stopped at end 23 of first hole portion 20. Guide tube end 27 can be shaped to be able to fit between adjacent fibers or fiber tows of fiber preform 14 without catching or pushing fibers and/or fibers tows when being inserted through fiber preform 14. For example, guide tube 26 can have a pointed or slanted end similar to a hypodermic needle as illustrated. Guide tube 26 can be manufactured of a metal alloy, a nylon, or any other rigid material that is compatible with the CMC material. In some examples, guide tube 26 can be a commercially available hypodermic needle. Tube-drawn stainless steel hypodermic needles are available in standard sizes with internal diameters similar to desired cooling hole diameters and with wall thicknesses suitable for forming holes according to the disclosed method.

Figure 2:
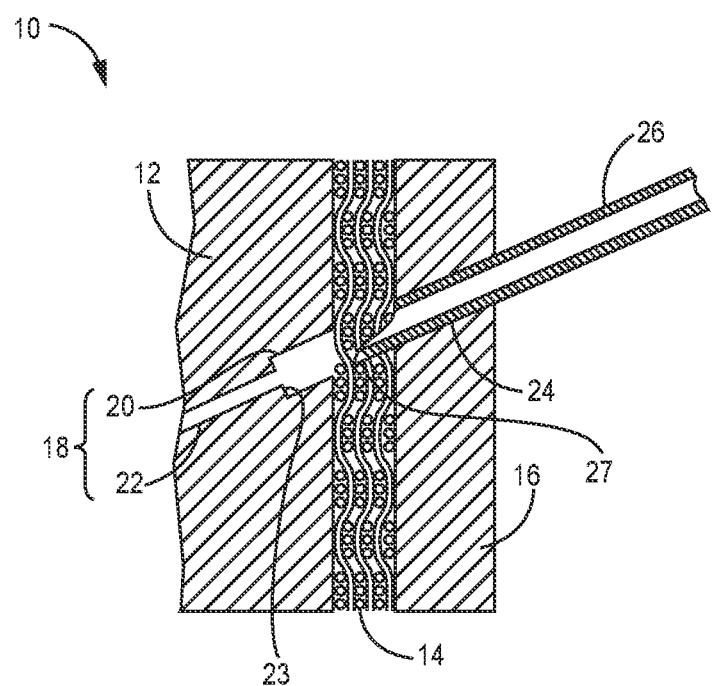
FIG. 2 is a cross-sectional view of the fiber preform in the tooling of FIG. 1, illustrating a step of inserting a guide tube through the hole of one of the tool components and into the fiber preform in the method of forming a cooling hole.

FIG. 2 is a cross-sectional view fiber preform 14 in the first and second tool components 12, 16, illustrating a step of inserting guide tube 26 through hole 24 of second tool component 16 and into fiber preform 14. As previously discussed, guide tube end 27 is shaped to fit between fibers and/or fiber tows and displace fibers and/or fiber tows around guide tube 26, such that a space between fibers and/or fibers tows is expanded to make room for guide tube 26 as guide tube 26 passes through fiber preform 14. Guide tube end 27 and guide tube 26 can be received into fiber preform 14 without catching or pressing fibers and/or fiber tows into counterbore hole 18.

Figure 3:
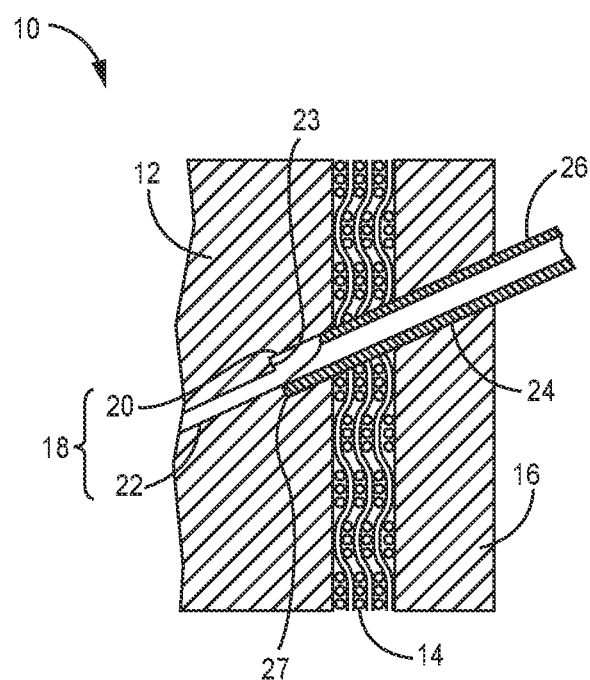
FIG. 3 is a cross-sectional view of the fiber preform in the tooling of FIG. 1, illustrating a step of inserting a guide tube through the fiber preform and into the hole of the other tool component in the method of forming a cooling hole.

FIG. 3 is a cross-sectional view of the fiber preform 14 in the first and second tool components 12, 16, illustrating a step of inserting guide tube 26 through fiber preform 14 and into counterbore hole 18 of first tool component 12. As illustrated in FIG. 3, guide tube 26 can be inserted through fiber preform 14 such that fibers and/or fiber tows are not pressed into counterbore 18. Instead, fibers and/or fiber tows are displaced around guide tube 26, primarily within the plane in which they were laid, such that a shape of fiber preform 14 is substantially maintained. The fibers of fiber preform 14 are not broken by guide tube 26. Guide tube 26 can be inserted into first hole portion 20 of counterbore hole 18 until guide tube 26 reaches end 23. In some examples, end 23 can be shaped to conform to a shape of end 27 of guide tube 26 to help secure guide tube 26 in counterbore 18.

Figure 4:
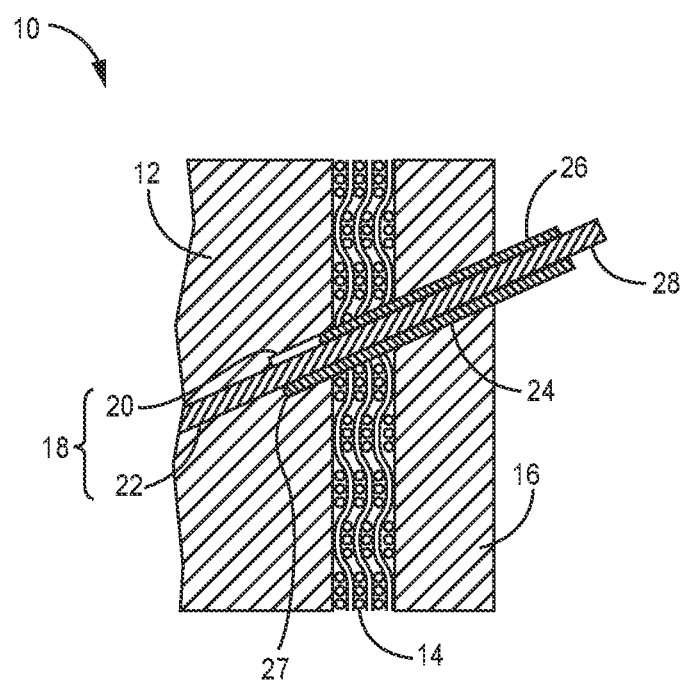
FIG. 4 is a cross-sectional view of the fiber preform in the tooling of FIG. 1, illustrating a step of inserting a rod into the guide tube in the method of forming a cooling hole.

FIG. 4 is a cross-sectional view of fiber preform 14 in the first and second tool components 12, 16, illustrating a step of inserting rod 28 into guide tube 26. Rod 28 can be formed from the same material as first and/or second tool components 12 and 16, which can be removed from the CMC component following or during a densification step thereby leaving a cooling hole in the CMC component. For example, rod 28 can be formed of graphite, which can be burned out in the densification process. Rod 28 is shaped and sized to form the desired cooling hole through the CMC component. For example, rod 28 can have a circular, rectilinear, oval, racetrack, or other cross-sectional shape. As illustrated in FIG. 4, both rod 28 and the passage through guide tube 16 are cylindrical. In other examples, however, the inner passage through guide tube 28 can more generally have a cross-sectional shape matching the cross-sectional shape of rod 28. Similarly, the outer cross-sectional shape of guide tube 26 can be cylindrical or can match a cross-sectional shape of rod 28. A cross-sectional area or diameter of rod 28 is less than the inner cross-sectional area or diameter of the passage through guide tube 26, such that rod 28 is able to be received in guide tube 26.

Rod 28 is received in guide tube 26 and counterbore 18. Rod 18 extends beyond end 27 of guide tube 26 and into second hole portion 22 of guide tube 26. Diameter d2 of second hole portion 22 can be slightly larger than an outer diameter of rod 28 such that rod 28 can be received in second hole portion 22. Second hole portion 22 can have a cross-sectional shape matching a cross-sectional shape of rod 28. Second hole portion 22 can have a cross-sectional area or diameter d2 that is narrowly larger than a cross-sectional area or diameter of rod 28 such that second hole portion 22 maintains a position or orientation (e.g., angle) of rod 28 and substantially limits side-to-side movement of rod 28 within second hole portion 22. In some examples, rod 28 can be glued into counterbore 18 to retain rod 28 in counterbore 18.

Figure 5:
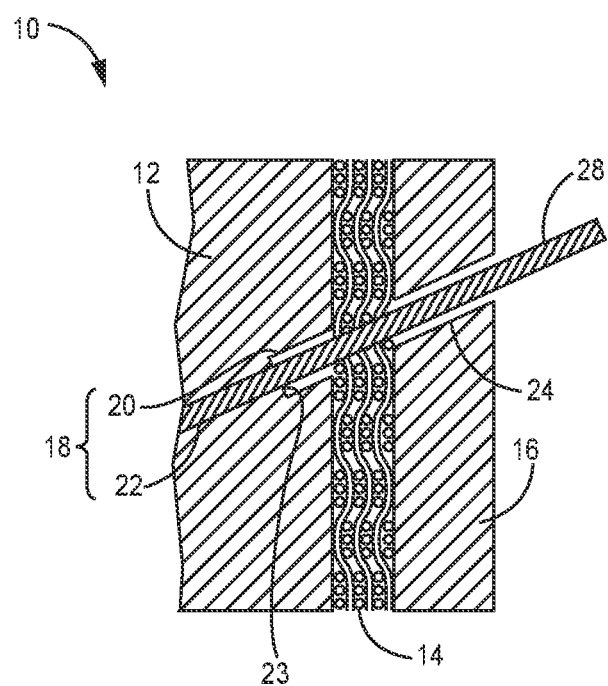
FIG. 5 is a cross-sectional view of the fiber preform in the tooling of FIG. 1, illustrating a step of removing the guide tube from the tooling in the method of forming a cooling hole.

FIG. 5 is a cross-sectional view of fiber preform 14 in the first and second tool components 12, 16, illustrating a step of removing guide tube 26 from first tool component 12 and second tool component 16. Rod 28 is retained in first and second tool components 12 and 16. The outer diameter or cross-section of guide tube 26 can be shaped and sized to allow for easy removal from counterbore 18 and hole 24. The inner passage of guide tube 26 can be shaped and sized to allow for easy removal of guide tube 26 from rod 28. As guide tube 26 is removed from first and second tool components 12 and 16, fibers and/or fiber tows of fiber preform 14 relax toward their initial position and close a gap between rod 28 and the fibers and/or fiber tows formed by guide tube 26. The fibers and/or fiber tows can relax to close around rod 28, such that fibers and/or fiber tows contact and enclose the portion of rod 28 positioned in fiber preform 14.

Figure 6:
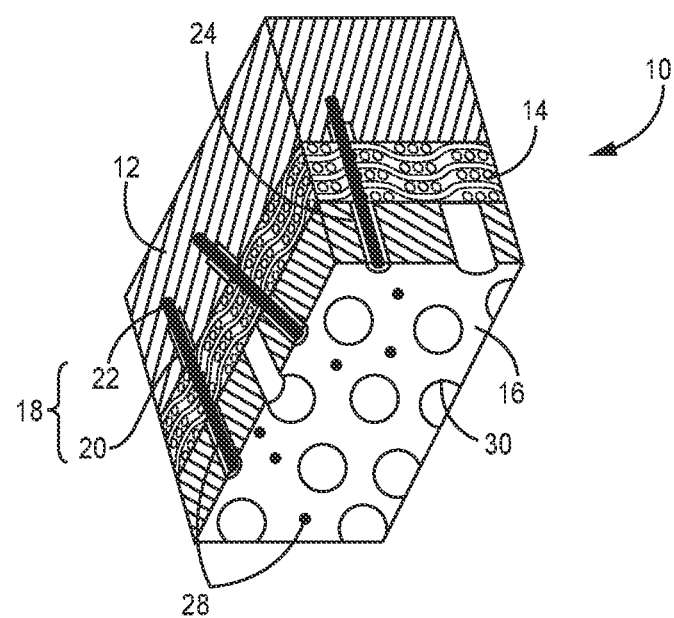
FIG. 6 is a perspective cross-sectional view of the fiber preform in the tooling of FIG. 1, illustrating a plurality of cooling holes being formed.

FIG. 6 is a perspective cross-sectional view of fiber preform 14 in the first and second tool components 12, 16, illustrating a plurality of cooling holes being formed. FIG. 6 shows first tool component 12, fiber preform 14, second tool component 16, counterbore holes 18, first hole section 20, second hole section 22, holes 24, rods 28, and holes 30.

Holes 30 are formed though second tool component 16 to provide passages for densifying gases in a densification process. Guide tubes 26 have been removed leaving rods 28 in place.

Rods 28 can be oriented at differing angles through fiber preform 14 and can be spaced in varying arrangements. As illustrated in FIG. 6, counterbore holes 18 can be oriented at differing angles relative to a surface of first tool 20 to which counterbore holes 18 open. An orientation of holes 24 through second tool component 16 can match the orientation of corresponding counterbore holes 18, such that holes 24 and counterbore holes 18 are coaxial. As shown, counterbore 18 can be a blind hole with an end in first tool component 12. Second hole portions 22 can be sized to approximately match an outer diameter or cross-sectional area of rods 28 to help maintain the orientation of rods 28 in fiber preform 14. A gap is formed between the walls of first hole portion 20 and rod 28 and between the walls of hole 24 and rod 28 with the removal of guide tube 26. Fibers and/or fiber tows of fiber preform 14 have relaxed and closed around rods 28, such that fibers and/or fiber tows contact and enclose the portion of rods 28 in fiber preform 14. Rods 28 can have a length less than, equal to, or greater than a combined length of the hole formed between an inner most portion of counterbore 18 and outer surface of second tool component 16. As such, an end of rod 28 can be recessed in hole 24, can be located at the outer surface of second tool component 16, or can extend outward of the outer surface of second tool component 16.

Holes 30 can be sized and shaped as appropriate for delivering densifying gases to fiber preform 14. Holes 30 can be arranged so as not to interrupt holes 24. Second tool component 16 can be fixed relative to first tool component 12 via fasteners or retention mechanisms that maintain alignment of holes 24 and counterbore holes 18 in a densification step.

Fiber preform 14 is densified to form the CMC component. Fiber preform 14 can be fully or partially densified with a ceramic matrix in second tool component 16 via chemical vapor infiltration (CVI). A ceramic matrix material can be, for example, silicon carbide. In some examples, second tool component 16 can be removed following partial densification of fiber preform 14 or following a densification step sufficient to provide structural rigidity to fiber preform 14. Rods 28 can remain in fiber preform 14 and first tool component 12 through additional densification steps. In some examples, fiber preform 14 can be densified through one or more densification processes, such as melt infiltration, slurry infiltration, and CVI. In some examples, an interface coating can be applied to fibers of fiber preform 14 via CVI prior to densification.

Rods 28 can be removed during or following the densification process. For example, rods 28 can be removed via heat, acid, or other methods that do not damage the ceramic material of the CMC component. Cooling holes or passages remain open in the formed CMC component once rods 28 are removed.

First tool component 12 can be removed from the CMC component following densification. First and second tool components 12 and 16 can be reused. In embodiments in which the CMC component surrounds first tool component 12 in a manner such that first tool component 12 cannot be disassembled from the CMC component without damage, first tool component 12 can be removed via heat, acid, or other known methods.

Figure 7:
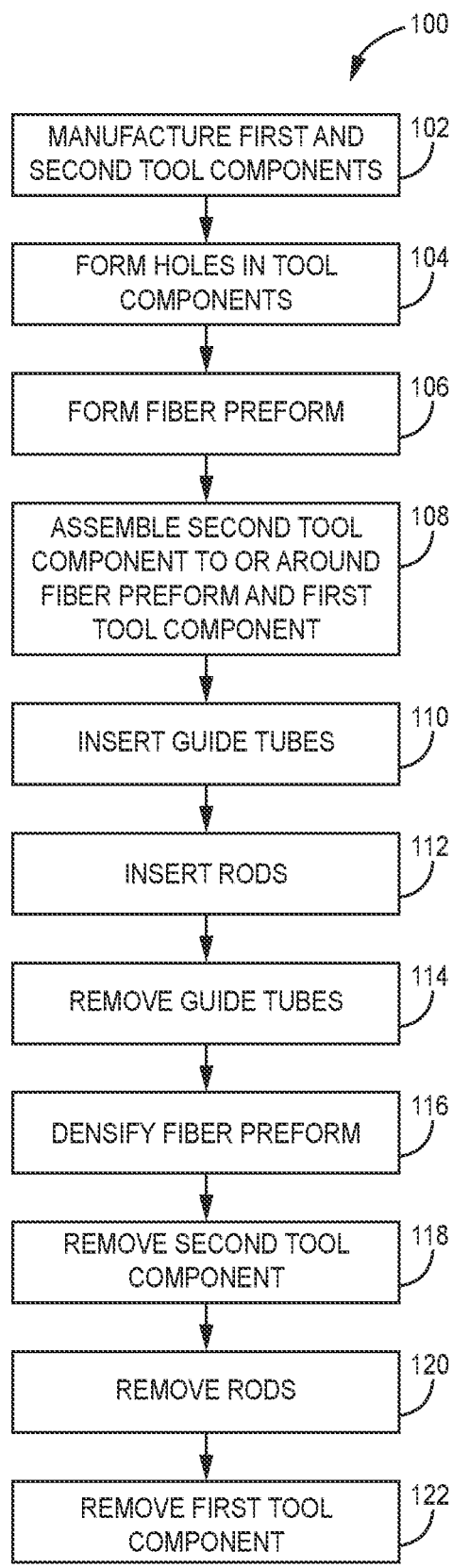
FIG. 7 is a flow chart of the method for forming cooling holes in a ceramic matrix composite component.

FIG. 7 is a flow chart of a method 100 of forming cooling holes in a CMC component as described above and illustrated in FIGS. 1-6. First and second tool components 12 and 16 are formed in step 102. First and second tool components 12 and 16 can be formed, for example, from a carbon material such as graphite. First and second tool components 12 and 16 can be cast and/or machined to have a shape matching an outer and/or interior surface of the CMC component. For example, first tool component 12 can have a shape of an airfoil core. First tool component 12 can have multiple components. For example, each component of first tool component 12 can form a different portion (e.g., passage) of the airfoil core. Second tool component 16 can have a surface matching a shape of the outer surface of the CMC component opposite the surface of the CMC component adjacent to first tool component 12. Second tool component 16 can be formed from multiple components that can be assembled together around fiber preform 14. First and second tool components 12 and 16 can be manufactured to include one or more alignment features to coaxially locate corresponding holes 24 and counterbore hoes 18. One or more retention mechanisms can be used to secure second tool component 16 around or to first tool component 12 or to secure components of second tool component 16 together.

Counterbore holes 18 and holes 24 are formed in first tool component 12 and second tool component 16, respectively, in step 104. Counterbore holes 18 and holes 24 can be drilled, e.g., via laser drilling or EDM. Counterbore holes 18 can be partially drilled into first tool component 12 to form blind holes. Holes 24 are drilled fully through second tool component 16.

Fiber preform 14 is formed in step 106. Fiber preform 14 can be formed via two-dimensional or three-dimensional weaving, braiding, or fiber placement. Fiber preform 14 can be formed from a braided tube. Fiber preform 14 can be formed from a plurality of fiber plies, which can be wrapped around or placed on a surface of first tool component 12. In some examples, a tackifier can be used to help maintain a shape of fiber preform 14. Fiber preform 14 can be assembled separate from first tool component 12 and applied to first tool component 12 following assembly. In other examples, fiber preform 14 can be formed directly on first tool component 12.

Second tool component 16 is positioned on or around an outer surface of fiber preform 14 in step 108. Second tool component 16 is assembled with first tool component 12 such that holes 24 are coaxial or align with counterbore holes 18. First and second tool components 12, 16 can include one or more alignment features to facilitate alignment of holes 24 and corresponding counterbore holes 18. Second tool component 16 can fully or substantially encase fiber preform 14, such that fiber preform 14 is fully or substantially disposed between first and second tool components 12, 16. Second tool component 16 can be fixed in place relative to first tool component 12 and fiber preform 14 via one or more retention mechanisms.

Guide tubes 26 are inserted through hole 24, fiber preform 14, and counterbore holes 18 in step 110. Guide tubes 26 are inserted in a manner that causes displacement of fibers and/or fiber tows around guide tubes 26 and does not cause breakage of fibers or pressing of fibers and/or fiber tows into counterbore hole 18. Ends 27 of guide tubes can have an angled shape like a hypodermic needle to displace fibers and/or fiber tows in fiber preform 14.

Rods 28 are inserted into guide tubes 26 in step 112. Rods 28 are inserted into guide tubes 26 and into second hole portion 22 of counterbore hole 18. In some examples, rods 28 can be glued or otherwise secured in second hole portion 22.

Guide tubes 26 are removed from first and second tool components 12 and 16 in step 114. Guide tubes can be pulled outward away from rods 28, which remain in place. Guide tubes 26 can be removed prior to a first densification step.

Fiber preform 14 is at least partially densified in step 116. Fiber preform can be densified by one or more densification methods including CVI, melt infiltration, and slurry infiltration.

Second tool component 16 is removed from the partially or fully densified fiber preform 14 in step 118. Second tool component 16 can be removed from fiber preform 14, for example, after partial densification of fiber preform 14 via CVI or a partial densification step that provides sufficient rigidity to fiber preform 14 to maintain shape during the remaining densification process. Second tool component 16 can be mechanically removed from fiber preform 14 without damaging the ceramic matrix or fibers. For example, components of second tool component 16 can be mechanically separated or pulled away from fiber preform 14. If fiber preform 14 has not been fully densified, additional densification steps (116) can be performed subsequent to removal of second tool component 16.

Rods 28 are removed from the CMC component (densified fiber preform 14) in step 120. Rods 28 can be removed via heat (e.g., burning out), acid (dissolving), or other methods capable of removing rods 28 without damaging the CMC component.

First tool component 12 can be removed in step 122. First tool component 12 typically can disassembled from the CMC component for reuse. In other embodiments, first tool component 12 can be removed with rods 28 via heat, acid, or other methods capable of removing first tool component 12 without damaging the CMC component.

Additional densification or application of coatings, such as environmental barrier coatings or thermal barrier coatings can be carried out after first tool component 12 and rods 28 have been removed from the CMC component. In other examples, coatings can be applied while rods 28 and first tool component 12 are in place. Finishing machining or other finishing processes may be used to form the final CMC component.

The disclosed method of forming cooling holes in a CMC component is an improvement over conventional machining methods that cause fiber breakage and/or damage to the ceramic matrix. Additionally, the disclosed method does require integrating holes in the fiber layup process. For example, the disclosed method does not require arranging fibers around sacrificial rods during layup or cutting fiber plies. The second tool having holes that are coaxial with counterbore holes in the first tool allows precise placement of a rod within the fiber preform and use of a guide needle helps locate the rods in the counterbore holes and displace fibers in the fiber preform without breakage or pressing fibers into the counterbore hole.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A method for forming a hole in a ceramic matrix composite component includes providing a first tool component with a first hole, providing a fiber preform of the ceramic matrix composite component on the first tool component, positioning a second tool component on the fiber preform, such that the fiber preform is disposed between the first and second tool components, inserting a rod into the first and second holes and through the fiber preform, and performing a densification step of the fiber preform in the first and second tool components. The second tool component has a second hole coaxial with the first hole. The fiber preform is densified with a ceramic matrix.

The method of the preceding paragraph can further include inserting a guide tube into the first and second holes and through the fiber preform.

The method of any of the preceding paragraphs, wherein the first hole is a stepped hole having a first hole portion with a first diameter and a second hole portion with a second diameter less than the first diameter.

The method of any of the preceding paragraphs, wherein the first hole portion and second hole portion are coaxial.

The method of any of the preceding paragraphs, wherein inserting the guide tube into the first hole comprises inserting the guide tube into the first hole portion, wherein the guide tube has an outer diameter greater than the second diameter of the second hole portion.

The method of any of the preceding paragraphs, wherein inserting the rod into the first hole comprises inserting the rod through the first hole portion and into the second hole portion.

The method of any of the preceding paragraphs can further include removing the guide tube from the first and second tool components.

The method of any of the preceding paragraphs can further include densifying the fiber preform in the first and second tool components with the rod extending into the first and second holes and through the fiber preform.

The method of any of the preceding paragraphs can further include removing the rod from the densified fiber preform.

The method of any of the preceding paragraphs, wherein the fiber preform comprises braided or woven fibers.

A tool for forming holes in a ceramic matrix composite component includes a first tool component and a second tool component configured to confine a fiber preform of ceramic matrix composite component between the first and second tool components. The first tool component has a first hole. The second tool has a second hole and a plurality of third holes. The second hole is coaxial with the first hole. The plurality of third holes allows passage of densifying gases to the fiber preform. The third holes have a larger diameter than the second hole.

The tool of the preceding paragraph, wherein the first hole is stepped hole having a first hole portion with a first diameter and a second hole portion with a second diameter less than the first diameter, wherein the first hole portion opens to a surface positioned to be adjacent to the fiber preform.

The tool of any of the preceding paragraphs can further include a guide tube configured to be received in the first and second holes.

The tool of any of the preceding paragraphs, wherein the guide tube is configured to extend through the second hole and into the first hole portion of the first hole.

The tool of any of the preceding paragraphs, wherein the guide tube has an outer diameter greater than the diameter of the second hole portion of the first hole.

The tool of any of the preceding paragraphs, wherein the guide tube has an angled end.

The tool of any of the preceding paragraphs can further include a sacrificial rod configured to be received in the guide tube.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for forming a hole in a ceramic matrix composite component, the method comprising:
   providing a first tool component with a first hole, wherein the first hole is stepped hole having a first hole portion with a first diameter and a second hole portion with a second diameter less than the first diameter;
   providing a fiber preform of the ceramic matrix composite component on the first tool component;
   positioning a second tool component on the fiber preform, such that the fiber preform is disposed between the first and second tool components, wherein the second tool component has a second hole coaxial with the first hole, the second hole having a third diameter larger than the second diameter;
   inserting a guide tube into the first and second holes and through the fiber preform, wherein the guide tube has an outer diameter greater than the diameter of the second hole portion of the first hole and wherein the guide tube has an angled end having a non-90 degree angle;
   inserting a rod into the first and second holes and through the fiber preform; and
   performing a densification step of the fiber preform in the first and second tool components, wherein the fiber preform is densified with a ceramic matrix.

2. The method of claim 1, wherein the first hole portion and second hole portion are coaxial.

3. The method of claim 1, wherein inserting the guide tube into the first hole comprises inserting the guide tube into the first hole portion.

4. The method of claim 3, wherein inserting the rod into the first hole comprises inserting the rod through the first hole portion and into the second hole portion.

5. The method of claim 4, and further comprising removing the guide tube from the first and second tool components.

6. The method of claim 5, and further comprising densifying the fiber preform in the first and second tool components with the rod extending into the first and second holes and through the fiber preform.

7. The method of claim 6, and further comprising removing the rod from the densified fiber preform.

8. The method of claim 1, wherein the fiber preform comprises braided or woven fibers.

9. A tool for forming holes in a ceramic matrix composite component, the tool comprising:

a first tool component having a first hole wherein the first hole is stepped hole having a first hole portion with a first diameter and a second hole portion with a second diameter less than the first diameter; and a second tool component configured to confine a fiber preform of ceramic matrix composite component between the first and second tool components, the second tool component having:

a second hole extending through the second tool component and having a third diameter, wherein the second hole is coaxial with the first hole and wherein the third diameter is larger than the second diameter; and a plurality of third holes to allow passage of densifying gases to the fiber preform, the third holes having a larger diameter than the second hole; and a guide tube configured to be received in the first and second holes, wherein the guide tube has an outer diameter greater than the diameter of the second hole portion of the first hole and wherein the guide tube has an angled end having a non-90 degree angle.

10. The tool of claim 9, wherein the first hole portion opens to a surface positioned to be adjacent to the fiber preform.

11. The tool of claim 9, wherein the guide tube is configured to extend through the second hole and into the first hole portion of the first hole.

12. The tool of claim 9, and further comprising a sacrificial rod configured to be received in the guide tube.

13. The tool of claim 12, wherein the sacrificial rod is configured to extend through the second hole and first hole portion of the first hole and into the second hole portion of the first hole.

14. The tool of claim 10, wherein the second hole opens to a first surface and an opposite second surface of the second tool component, the first surface positioned to be adjacent to the fiber preform.

* * * * *